Aug. 19, 1930.  J. L. ROSENFIELD  1,773,202
APPARATUS FOR PREPARING GRANULAR OR THE LIKE MATERIALS
Original Filed July 29, 1926  3 Sheets-Sheet 1
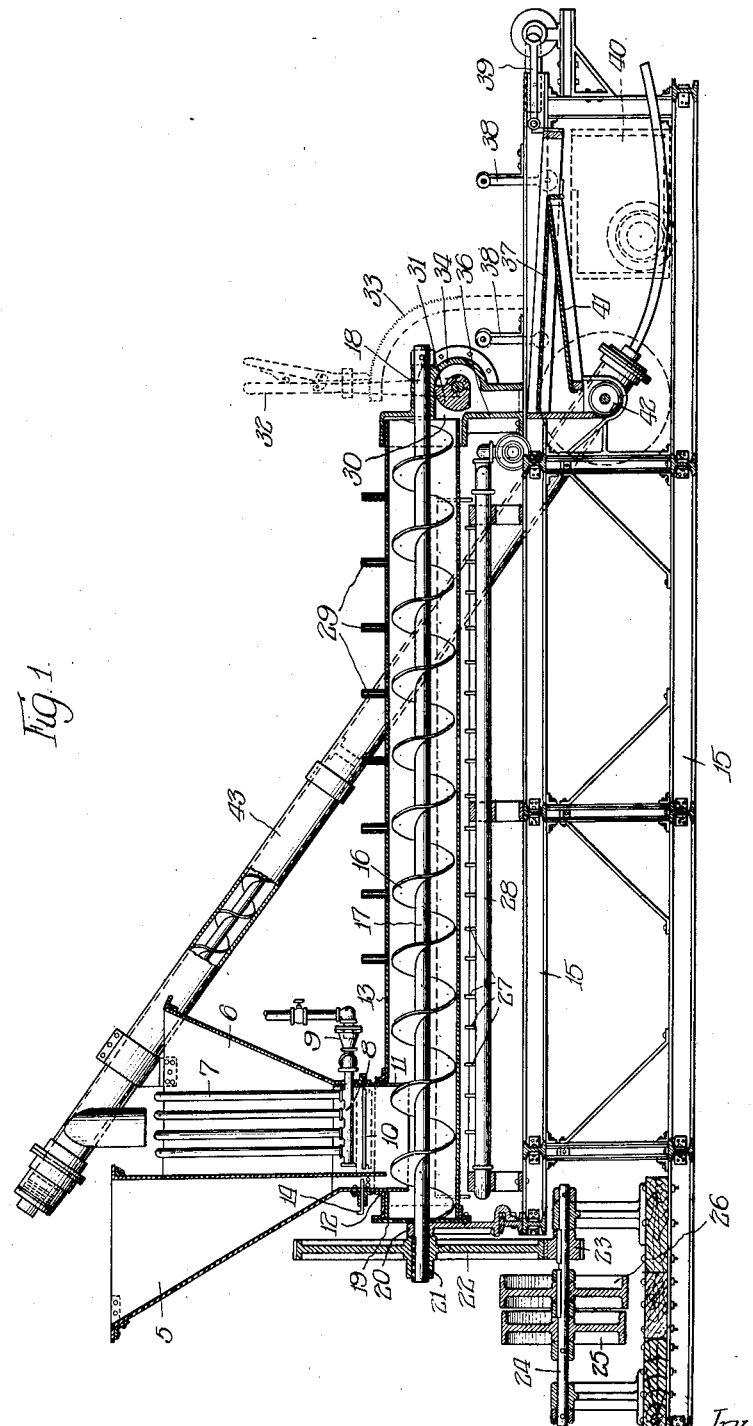
Inventor
Joseph L. Rosenfield,
By

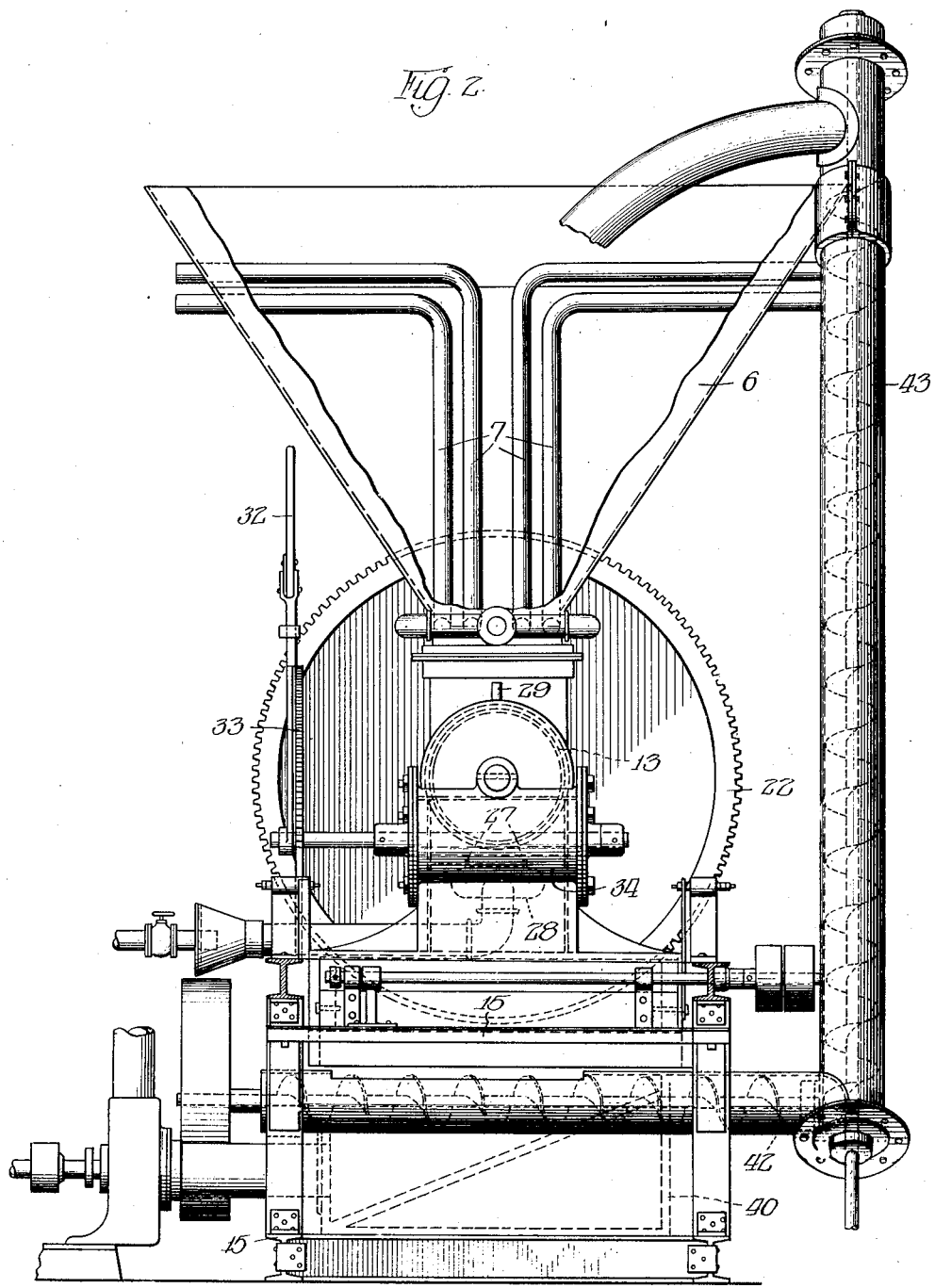

Aug. 19, 1930.  J. L. ROSENFIELD  1,773,202
APPARATUS FOR PREPARING GRANULAR OR THE LIKE MATERIALS
Original Filed July 29, 1926  3 Sheets-Sheet 3
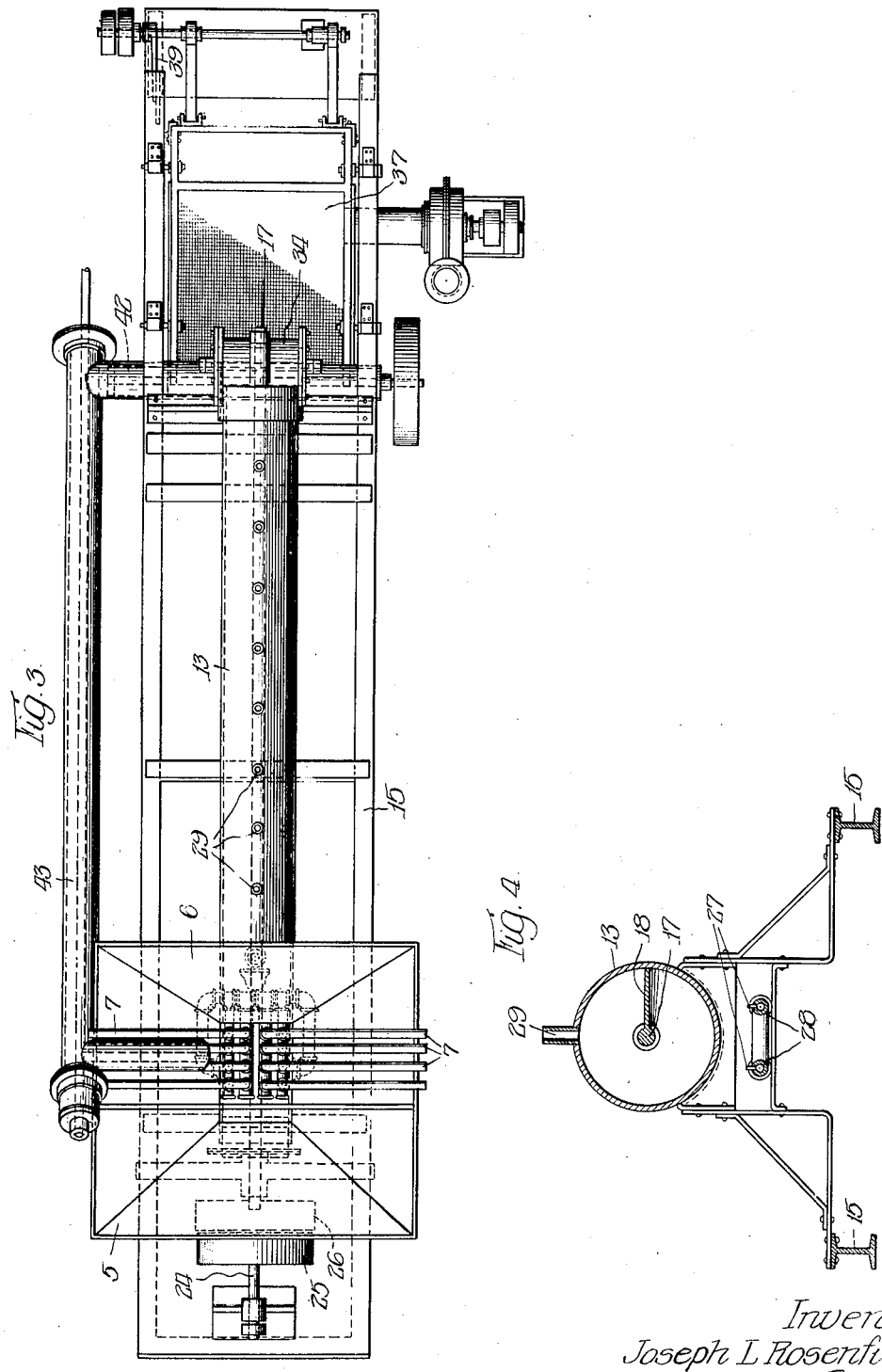
Inventor
Joseph L Rosenfield, Patented Aug. 19, 1930

1,773,202

UNITED STATES PATENT OFFICE

JOSEPH L. ROSENFIELD, OF ALAMEDA, CALIFORNIA

APPARATUS FOR PREPARING GRANULAR OR THE LIKE MATERIALS

Original application filed July 29, 1926, Serial No. 125,698. Divided and this application filed February 21, 1927. Serial No. 169,887.

This application is a division of my co-pending application Serial No. 125,698 filed July 29, 1926, for Process of preparing granular or the like materials.

The invention while relating generally to the preparation of materials has particular reference to an apparatus for the treatment, so to speak, of granular or the like raw commodities, such as coffee, cocoa beans, peanuts, and other such commodities which are ordinarily roasted or otherwise heat treated prior to their ultimate preparation for consumption. The field of operation embraced by the apparatus is, in no way, confined to the treatment of the specific granular materials named, and in this connection, so far as concerns the possibilities of the invention, I do not make any distinction between peanuts, cocoa beans, coffee and such distinctively granular materials, and any other materials the nature of which, while not granular in the generally accepted meaning of the term, are at the same time in such form which permits the same to be accommodated by the apparatus.

As one outstanding example of this possibility I will mention the cooking of whole and unpeeled potatoes. There are, of course, other food products which may also be included but the examples given will suffice to explain the process and operation of the apparatus.

To begin with, as explained in my hereinbefore identified co-pending application, I have discovered that certain edible products when treated in accordance with my process develop unusually pleasing flavors, aromas, and other desirable qualities heretofore unknown to exist. This applies for the most part to coffee, peanuts and other such products that are usually roasted to bring out their flavors. The same principle would likewise apply in other instances, as for example, in baking potatoes, but its most important use would apply in connection with those products which require a preliminary roasting treatment prior to final preparation for ultimate consumption, and without limiting the spirit of the invention to these particular products, I will use the same as a basis of illustration.

Briefly the invention has to do with commingling the granular material to be treated with a subdivided heat vehicle which imparts to the product the required heat to roast or cook the same to a predetermined extent, whereby the resultant product, while resembling nothing more than the same product roasted as heretofore practiced, will develop a decided improvement in flavor, aroma, and other desirable qualities when ultimately prepared for consumption.

I am not prepared at this time to advance any reliable theories as to the why and wherefore of this phenomenon, except to say that every indication points to what I believe to be a quick, if not an instantaneous skin sealing effect which develops a sealing film on the outside of the coffee bean, as an example, and completely sealing the bean so that the full flavor of the volatile constituents are positively retained within and carried intact until the product is finally prepared for consumption or consumed without other preparation, as in the case of ordinary roasted peanuts.

As still another feature of the process, and of equal importance, is the element of time required to treat the materials. For instance, as heretofore practiced, it usually requires about thirty to forty minutes to roast coffee. With my improved apparatus, I can complete the roasting of the same quantity of coffee in about five or six minutes and with better results.

Furthermore, the simplicity of the process will enable me to practice the same at least on a small scale at times and in places where the old methods and apparatus would be totally impractical if not impossible.

Further features will follow with reference to the accompanying drawings which illustrate the preferred apparatus for reducing the process to practice.

In said drawings Fig. 1 is a view in side elevation and partly in section, of a complete apparatus;

Fig. 2 is a view in end elevation of the apparatus, with part of the hopper broken away;

Fig. 3 is a plan view of the apparatus; and

Fig. 4 is a cross section on the line 4—4, Fig. 1.

As previously stated, the process contemplates the use of a sub-divided heat vehicle as a means of roasting or otherwise treating the materials to realize the results desired and for this reason I provide a divided hopper or else a pair of hoppers 5 and 6, one of which namely 5, accommodating the raw material, and the other accommodating the subdivided heat vehicle which may be sand, salt, or any similar material suitable for the purpose. I prefer sand for the most part, or else a composition in which sand predominates. At any rate the nature of vehicle is more or less immaterial, so long as it performs satisfactorily.

Since I desire to pre-heat the vehicle before mingling the product therewith, the hopper 6 is equipped with heating means preferably a gas heater embodying in its construction a plurality of heating tubes 7, each tube being connected to the burner 9. The pipes are separated so as to offer sufficient heat radiating surfaces to properly heat the sand contained in the hopper without undue loss of time, reckoned from the time it is deposited therein in successive quantities.

The products of combustion from the burner circulating through the pipes may be carried off by extending the pipes to a convenient flue or else terminating the same at a desirable distance away from the apparatus.

Both of the hoppers 5 and 6 are provided with discharge gates or one gate common to both, so as to release measured quantities of the product and likewise the sand, and after the operation of the apparatus is timed and established this gate or the gates, as the case may be, may be set so as to hold any predetermined adjustment effecting the discharge area of the hoppers. These gates are shown as at 10 in the enclosure 11 which comprises a skirt connecting the hoppers with the cylindrical roaster 12. The former extending through an opening in the roaster as at 13 adjacent the receiving end thereof.

The manipulating means for the gates is shown at 14. The roaster may be made in the form of a relatively long horizontal and stationary cylinder mounted upon a supporting structure 15. Mounted with freedom of rotation within the cylinder 13 and coaxially therewith, is an Archimedean screw 16, the shaft 17 for which is confined in an exterior journal 18 at the discharge end of the cylinder. The opposite end of the shaft extends through the closure 19 at the receiving end of the cylinder and aside from being journaled in the bearing 20 is keyed to the hub 21 of the large driven gear wheel 22. The wheel 22 is driven by the pinion 23 mounted on the shaft 24 and the shaft is driven in turn by either of the two variable speed pulleys 25 and 26. One pulley being larger than the other so that a belt, not shown, may be transferred from one to the other for developing a change of speed for the screw 16.

Disposed beneath the cylinder 13 for substantially the length of the same are a series of gas burners 27, the same being arranged at spaced intervals along a manifold pipe 28 which is supplied with gas from a suitable source of supply. These burners are provided as a means of heating the cylinder which in turn will maintain the heated state of the sand passing through the cylinder. The control for the burners will enable the temperature control for the sand to be accurately and evenly adjusted.

With this much of the apparatus explained, it will be readily seen that when the gate or gates 10 are opened to release a predetermined quantity of heated sand and raw material, to be heat-treated thereby, the materials will be deposited in a more or less mixed or co-mingled state at least in immediate association with one another, and as the screw 16 is rotating at the time the mixed materials will be carried toward the opposite end of the cylinder and at the same time agitated and co-mingled one with the other. As a result the particles of raw-material, coffee beans, for instance, will be embedded in and by agitation commingled with hot sand and thoroughly roasted by the time they are discharged from the cylinder and separated from the sand.

The proportion of sand to raw material will vary according to requirements, such adjustments likewise apply to the temperature of the sand and the speed of operation. In most instances I heat the sand to a temperature and use enough of it to assure a quick skin sealing as otherwise the best results may be sacrificed.

In treating most material little, if any, moisture will be accumulated in the cylinder 13. However, to avoid such a possibility the top of the cylinder may be equipped with a plurality of vents 29. When the commingled materials reach the discharge end of the cylinder, they are discharged through an opening 30, the port area of which is controlled by a cam valve 31 operated by a manually manipulated lever 32. The lever in this respect being operable in combination with a segment 33 so as to either hold the valve 30 closed, or else open to any desired extent so as to control the amount of material released from the cylinder. The valve is mounted in a housing 34 having a downwardly depending apron 35 which is so disposed in relation to the wall 36 as to provide a chute for directing the mixed materials on the inclined shaker screen 37. The screen being suspended from the pivoted hangers 38 and more or less violently reciprocated by a short stroke pitman 39. The inclined end of the screen is hung over a receptacle 40 which collects the treated product and from which it is conveyed away through a pipe or else otherwise emptied.

The separated sand falls on an inclined table 41 and then into the transverse subconveyor 42, from which it is collected by the screw conveyor 43 and returned into the hopper 6. The sand return provides a continuous process and the fact that the sand is practically unexposed to the air throughout, it loses little, if any appreciable amount of heat. Any loss in this respect will be readily restored when the same is returned to the hopper.

In the past, particularly in the case of coffee, it is often difficult to get a "uniform roast". With my apparatus this is assured, since each individual particle or bean is embedded in the sand so that all sides react to the heat which is likewise maintained at a uniform roasting temperature throughout the commingling stage of the process.

Ordinarily the ratio of sand to material roaster will be about 2 or 3 to one, that is to say about 2 or 3 parts sand to one part material. These proportions will naturally vary according to the accommodations afforded by the apparatus and the nature of the material prepared. I might also explain at this point that the quantity of mixed material and sand will just about keep the shaft of the screw burned, at least a sufficient amount of sand is maintained in the cylinder so as to avoid any possibility of the material floating, so to speak, on top of the sand. The screw, however, will keep the mix thoroughly agitated and will be continuously picking the sand up from the bottom and keeping it stirred up. This is important in order to keep the particles of material buried or embedded so that a uniform roast will result.

As previously stated, the timing of operations is important as by this means the roast may be prolonged or shortened, as occasion demands. The temperature control is likewise important to accommodate the process to different kinds of materials.

I claim:

1. In an apparatus of the class described, a roasting receptacle, means associated therewith for delivering measured quantities of a product to be roasted, and means for delivering measured quantities of a subdivided heat vehicle to said receptacle, means for commingling the product to be roasted with the subdivided heat vehicle while passing the same through the receptacle, means for regulating the quantity of the commingled materials discharged from the receptacle and means for maintaining the subdivided heat vehicle at a roasting temperature during the time it is retained in the receptacle.

2. In an apparatus of the class described, a substantially horizontally disposed heated receptacle, hopper delivery means at one end of the receptacle, gates for controlling the delivery of material from the hopper delivery means into the receptacle, a screw conveyor for moving the delivered material longitudinally along the receptacle, a discharge at one end of the receptacle, means for controlling the effective port area of the discharge and means for collecting a portion of the material discharge and conveying the same back to the hopper delivery means.

3. In an apparatus of the class described, a substantially horizontally disposed heated receptacle, hopper delivery means at one end of the receptacle, gates for controlling the delivery of material from the hopper delivery means into the receptacle, a screw conveyor for moving the delivered material longitudinally along the receptacle, a discharge at one end of the receptacle, means for controlling the effective port area of the discharge and means for collecting a portion of the material discharged and conveying the same back to the hopper delivery means comprising collecting receptacle communicating with a screw conveyor, the discharge end of said screw conveyor discharging into the hopper delivery means.

4. In an apparatus of the class described, a pair of hoppers, one of said hoppers adapted to contain a material to be treated with a subdivided heat vehicle contained in the other hopper, means for heating the sub-divided heat vehicle while contained in its hopper, a heating and mixing receptacle, means for discharging measured quantities of the material contained in the hopper into one end of the heating receptacle, a screw conveyor in the heating receptacle for commingling the materials by agitation and conveying the same to the opposite end of the receptacle, driving means for the screw conveyor, means for controlling the speed of the driving means, means for heating the receptacle for substantially the length thereof, and means for regulating the heating means, a discharge at one end of the heating receptacle, and means for collecting the materials from said discharge and separating the treated material from the sub-divided heat vehicle.

5. In an apparatus of the class described, a pair of hoppers, one of said hoppers adapted to contain a material to be treated with a subdivided heat vehicle contained in the other hopper, means for heating the sub-divided heat vehicle while contained in its hopper, a heating and mixing receptacle, means for discharging measured quantities of the material contained in the hopper into one end of the heating receptacle, a screw conveyor in the heating receptacle for commingling the materials by agitation and conveying the same to the opposite end of the receptacle, driving means for the screw conveyor, means for controlling the speed of the driving means, means for heating the receptacle for substantially the length thereof, and means for regulating the heating means, a discharge at one end of the heating receptacle, and means for collecting the materials from said discharge and separating the treated material from the sub-divided heat vehicle and means for returning the sub-divided heat vehicle to its hopper.

6. In an apparatus of the class described, a pair of hoppers, one of said hoppers adapted to contain a material to be treated with a sub-divided heat vehicle contained in the other hopper, means for heating the sub-divided heat vehicle while contained in its hopper, a heating and mixing receptacle, means for discharging measured quantities of the material contained in the hopper into one end of the heating receptacle, a screw conveyor in the heating receptacle for commingling the materials by agitation and conveying the same to the opposite end of the receptacle, driving means for the screw conveyor, means for controlling the speed of the driving means, means for heating the receptacle for substantially the length thereof, and means for regulating the heating means, a discharge at one end of the heating receptacle, and means for collecting the materials from said discharge and separating the treated material from the sub-divided heat vehicle and means for returning the sub-divided heat vehicle to its hopper, comprising an elevator screw, the receiving end of said elevator screw communicating with a container into which the sub-divided heat vehicle is delivered after being separated from the treated material, and the opposite end of the elevator screw discharging into the heated hopper for the sub-divided heat vehicle.

7. In an apparatus of the class described, a pair of hoppers, one of said hoppers adapted to contain a material to be treated with a sub-divided heat vehicle contained in the other hopper, means for heating the sub-divided heat vehicle while contained in its hopper, a heating and mixing receptacle, means for discharging measured quantities of the material contained in the hopper into one end of the heating receptacle, a screw conveyor in the heating receptacle for commingling the materials by agitation and conveying the same to the opposite end of the receptacle, driving means for the screw conveyor, means for controlling the speed of the driving means, means for heating the receptacle for substantially the length thereof, and means for regulating the heating means, a discharge at one end of the heating receptacle, and means for collecting the materials from said discharge and separating the treated material from the sub-divided heat vehicle, comprising a shaker screen disposed beneath the discharge in the heating receptacle, the sub-divided heat vehicle passing thru the screen, a slanting table beneath the screen, said table discharging onto a sub-conveyor, and an elevator conveyor collecting the sub-divided heat vehicle from said sub-conveyor and returning the same to its hopper.

8. An apparatus for preparing granular or the like materials comprising a pair of hoppers, one of said hoppers adapted to contain the material to be prepared, and the other of said hoppers adapted to contain a subdivided heat vehicle, a material-heating receptacle, into which both of said hoppers discharge, means for commingling the material and vehicle in the heating receptacle as they are discharged from their respective hoppers, discharge means in the heating receptacle, means for collecting the commingled material and vehicle as they are discharged from the heating receptacle, and means for separating the same; means being provided for bringing the heat-vehicle to heat treating temperature by the time it meets the material to be treated.

9. An apparatus for preparing granular or the like materials comprising a pair of hoppers, one of said hoppers adapted to contain the material to be prepared, and the other of said hoppers adapted to contain a subdivided heat vehicle, a material-heating receptacle, into which both of said hoppers discharge, means for commingling the material and vehicle in the heating receptacle as they are discharged from their respective hoppers, discharge means in the heating receptacle, means for collecting the commingled material and vehicle as they are discharged from the heating receptacle, and means for separating the same as they are collected; means being provided for heating the vehicle before it meets the material.

10. An apparatus for preparing granular or the like materials comprising a pair of hoppers, one of said hoppers adapted to contain the material to be prepared, and the other of said hoppers adapted to contain a subdivided heat vehicle, a heating receptacle, into which both of said hoppers discharge, means for commingling the material and vehicle in the heating hoppers, discharge means in the heating receptacle, means for collecting the commingled material and vehicle as they are discharged from the heating receptacle, means for separating the same as they are collected and means for returning the separated sub-divided heat vehicle without cooling to its hopper for reuse; means being provided for maintaining effective temperature in the returned vehicle before it again meets the material to be treated.

11. An apparatus for preparing granular or the like materials, comprising a pair of hoppers, one of said hoppers adapted to contain the material to be prepared and the other of said hoppers being heated and adapted to contain and preheat a subdivided heat vehicle and deliver it in heated condition for commingling with the material to be treated, a heating receptacle into which both of said hoppers discharge, means for feeding the mingled material and vehicle through the heating receptacle, as they are discharged from their respective hoppers, and means for separating the commingled materials discharged from the heating receptacle.

12. An apparatus for roasting and preserving the flavor of coffee, peanuts, cocoa-beans, and the like, comprising a roasting receptacle, means for holding separated a quantity of the product to be roasted, means for preheating and holding, separated, a granular heat vehicle, and means for delivering measured quantities of said product and said preheated granular vehicle to the roasting receptacle and depositing the same within the receptacle in a substantially mixed condition.

13. An apparatus for roasting and preserving the flavor of coffee, peanuts, cocoa-beans, and the like, comprising a roasting receptacle, means for holding separated a quantity of the product to be roasted and a means for preheating and holding, separated, a quantity of granular heat vehicle, means for delivering measured quantities of said product and said preheated granular vehicle to the roasting receptacle and depositing the same within the receptacle in a substantially mixed condition, and means for further mixing the product and granular heat vehicle while passing them through the roasting receptacle.

JOSEPH L. ROSENFIELD.